United States Patent [19]
Lawler et al.

[11] Patent Number: 5,805,763
[45] Date of Patent: Sep. 8, 1998

[54] SYSTEM AND METHOD FOR AUTOMATICALLY RECORDING PROGRAMS IN AN INTERACTIVE VIEWING SYSTEM

[75] Inventors: Frank A. Lawler, Seattle; Joseph H. Matthews, III, Redmond, both of Wash.

[73] Assignee: Microsoft Corporation, Redmond, Wash.

[21] Appl. No.: 435,820

[22] Filed: May 5, 1995

[51] Int. Cl.⁶ .............................. H04N 5/76; H04N 7/173
[52] U.S. Cl. .................................. 386/83; 348/10; 348/12; 348/13
[58] Field of Search ......................... 358/335; 360/33.1, 360/69; 348/7, 12, 13, 10, 906, 14, 15, 16, 17; 455/179.1, 181.1, 185.1, 186.1, 4.2, 5.1, 6.2, 6.3; 386/83; H04N 5/76, 7/173

[56] References Cited

U.S. PATENT DOCUMENTS

| | | |
|---|---|---|
| 3,696,297 | 10/1972 | Otero . |
| 3,729,581 | 4/1973 | Anderson . |
| 3,778,721 | 12/1973 | Moran . |
| 4,222,069 | 9/1980 | Groetschel . |
| 4,325,081 | 4/1982 | Abe et al. . |
| 4,390,901 | 6/1983 | Keiser . |
| 4,598,288 | 7/1986 | Yarbrough et al. . |
| 4,641,205 | 2/1987 | Beyers, Jr. . |
| 4,706,121 | 11/1987 | Young ..................................... 358/142 |
| 4,787,063 | 11/1988 | Muguet . |
| 4,847,696 | 7/1989 | Matsumoto et al. . |
| 4,864,429 | 9/1989 | Eigeldinger . |
| 4,908,707 | 3/1990 | Kinghorn . |
| 4,908,713 | 3/1990 | Levine . |
| 5,003,384 | 3/1991 | Durden et al. . |
| 5,038,211 | 8/1991 | Hallenbeck . |
| 5,047,867 | 9/1991 | Strubbe . |
| 5,109,414 | 4/1992 | Harvey et al. . |
| 5,195,134 | 3/1993 | Inoue . |
| 5,223,924 | 6/1993 | Strubbe ..................................... 348/7 |
| 5,231,493 | 7/1993 | Apitz . |
| 5,253,066 | 10/1993 | Vogel . |
| 5,293,357 | 3/1994 | Hallenbeck . |
| 5,353,121 | 10/1994 | Young et al. . |
| 5,414,455 | 5/1995 | Hooper et al. .............................. 348/7 |
| 5,418,622 | 5/1995 | Takeuchi .................................. 358/335 |
| 5,557,316 | 9/1996 | Hoarty et al. .............................. 348/7 |
| 5,565,908 | 10/1996 | Ahmad ....................................... 348/7 |

FOREIGN PATENT DOCUMENTS

| | | |
|---|---|---|
| 420 123 | 4/1991 | European Pat. Off. . |
| 503 070 | 9/1992 | European Pat. Off. . |
| 4-213983 | 8/1992 | Japan . |
| 5-284480 | 10/1993 | Japan . |
| 6-62383 | 3/1994 | Japan . |
| 6-225236 | 8/1994 | Japan . |
| 2034995 | 6/1980 | United Kingdom . |
| 2126002 | 3/1984 | United Kingdom . |
| WO 88/04057 | 6/1988 | WIPO . |
| WO 89/002205 | 3/1989 | WIPO . |
| 95/01057 | 1/1995 | WIPO ............................ H04N 7/16 |
| WO 95/01057 | 1/1995 | WIPO . |

OTHER PUBLICATIONS

"Decoder IC for an Automatic Video Program Identification System (VPS)," International Conference on Consumer Electronics, Meindl et al., Jun. 3, 1986.

"An Interactive Menu–Driven Remote Control Unit for TV–Receivers and VC–Recorders," IEEE Transactions on Consumer Electronics, Aug. 1988.

"New Devices for VCR Control Using Teletext Services," 1992 IEEE International Conference on Consumer Electronics, James Jun. 2, 1992.

*Primary Examiner*—Tommy P. Chin
*Assistant Examiner*—Luanne P. Din
*Attorney, Agent, or Firm*—Klarquist Sparkman Campbell Leigh & Whinston, LLP

[57] ABSTRACT

A program recording system is provided to allow a user of an interactive viewing system to record a preselected program. The interactive viewing system includes at least one program guide that allows user selection of a program for recording. In response to the user selection, the system sets a record tag that is associated with the selected program and identifies the selected program for recording. The record tag is monitored and, at the appropriate time, prompts the system to control the recording of the selected program.

10 Claims, 8 Drawing Sheets

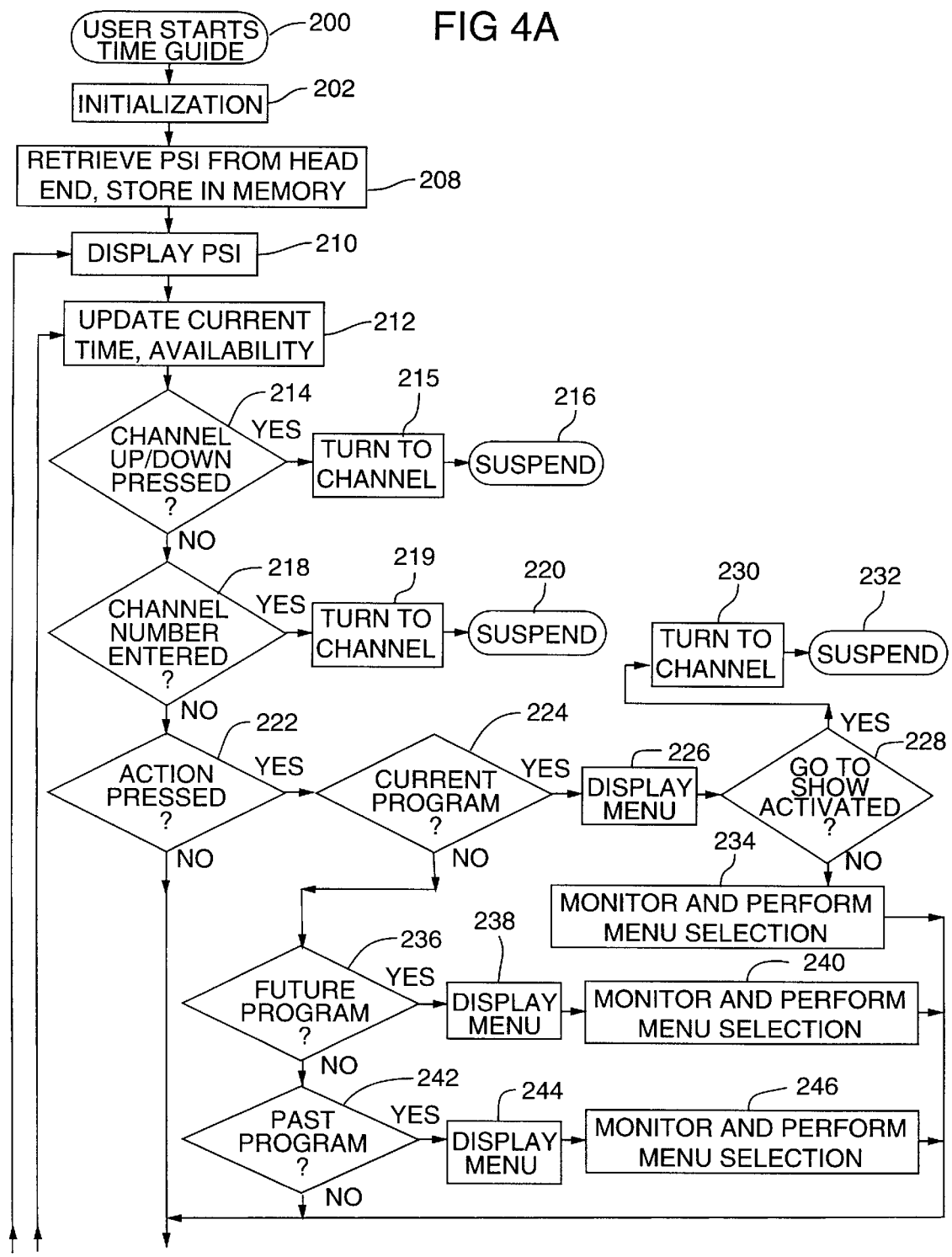

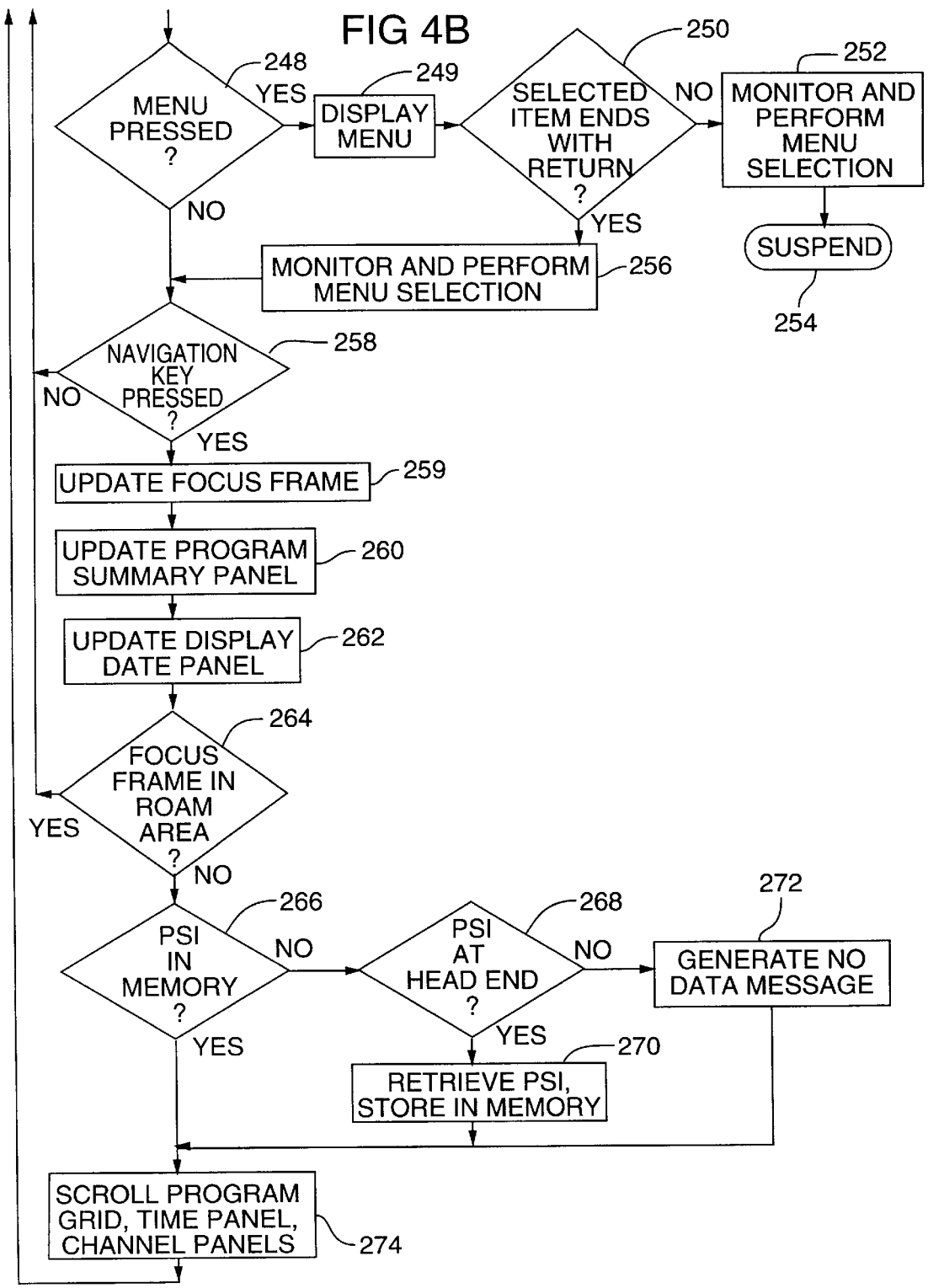

SYSTEM AND METHOD FOR AUTOMATICALLY RECORDING PROGRAMS IN AN INTERACTIVE VIEWING SYSTEM

BACKGROUND OF THE INVENTION

1. Field of the Invention

The present invention relates to a system for recording a program on an interactive viewing system and, more particularly, to a system that allows a user to identify a program for recording using an interactive program guide and then designate the identified program for automated recording at a later time.

2. Description of Related Art

The practice of recording television programs has become a commonly accepted way to increase the enjoyment and flexibility of television viewing. If a viewer's schedule conflicts with the broadcast time of a desired program, this practice allows the viewer to record the show and view it at a later, more convenient time. Alternatively, if a viewer has a particular interest in a program, the program can be recorded for repeated viewing.

The many advantages offered by the practice of recording programs are increased with the use of recording equipment that can be programmed to allow unattended recording of programs. Unfortunately, many recording systems are so complex and difficult to use that many users cannot reliably program their systems for future, unattended recording of a desired program. As a result, many users are denied the benefits and freedoms which such recording systems are intended to provide.

Past attempts to simplify the recording and programming process have been widespread. For example, U.S. Pat. No. 4,908,713 to Levine relates to a VCR programmer that displays detailed step-by-step instructions on a television screen in an effort to help a viewer program a VCR. The system may also allow the display of program schedule information to assist the user in selecting a program for future recording. Nonetheless, many television viewers remain unable to reliably and easily program their systems to record future programs.

SUMMARY OF THE INVENTION

Accordingly, it is an object of the present invention to provide a system that allows the user of an interactive viewing system to quickly and easily identify and select a desired program using an interactive program guide and to designate the selected program for recording.

A system in accordance with a preferred embodiment of the present invention is integrated into an interactive viewing system. The interactive viewing system typically includes a central head end in bidirectional communication with one or more viewer stations. Each viewer station has an interactive station controller, a video display operably coupled to the interactive station controller and an input device for providing user input to the interactive station controller. The head end makes available to the viewer stations a number of programs at different times and on different channels.

The interactive viewing system further includes one or more interactive program guides. For example, the system may include a program time guide which provides program schedule information identifying the times and channels for various programs. The system may also include a category-based guide which identifies programs by category and possibly subcategory, and personalized program guides which identify programs based on a user's personal preferences and viewing habits. The interactive program guides allow a user to navigate through the displayed program information and identify selected programs.

In a preferred embodiment of the present invention, a user may select a future program using an interactive program guide. The system identifies the selected program with a record tag which designates the selected program for recording. The record tag is stored and monitored by the system and, at the appropriate time, the system controls a recording device to record the selected program. The record tag may be stored at the head end.

In one aspect of the invention, the recording device is a video cassette recorder located at the viewer station and operatively coupled to the interactive station controller. The interactive station controller controls the recorder to record the selected program. The interactive station controller may input in advance of the selected program appropriate commands to program the recorder to record the selected program. Alternatively, the interactive station controller may control the recorder with real-time commands.

In another aspect of the invention the recording device is associated with the head end. The recording device, under the control of the head end, records the selected program and digitally stores it in a memory at the head end. The recorded and stored program can then be retrieved by the user for display at the viewer station.

In a further aspect of the invention, when a program for which a user has set a record tag is displayed in an interactive program guide for the user, the program is associated with an icon that indicates that a record tag has been set. This allows a user to quickly and easily identify programs for which record tags have been set.

Other objects and aspects of the invention will become apparent to those skilled in the art from the detailed description of the invention which is presented by way of example and not as a limitation of the present invention.

BRIEF DESCRIPTION OF THE DRAWINGS

FIGS. 4a and 4b are a flow diagram illustrating the operation of a preferred embodiment of a program time guide in which a recording system in accordance with a preferred embodiment of the present invention has been implemented.

DESCRIPTION OF THE ILLUSTRATED EMBODIMENT

The program recording system of the current invention may be implemented in a variety of environments. Here, it is described in the context of an interactive viewing system that offers at least a time-based program guide that allows a user to select a program. Having used the program time guide, or any other program guide, to identify a program, the user can quickly and easily select a program for recording by setting a record tag that designates the selected program for recording. The system stores and monitors the record tag and controls the operation of a recorder to record the selected program at the appropriate time.

To provide a context for understanding the current invention, a preferred example of an interactive viewing system and program time guide are described below. However, it should be appreciated that the program recording system could be implemented in different environments or with different program guides.

Figure 1:
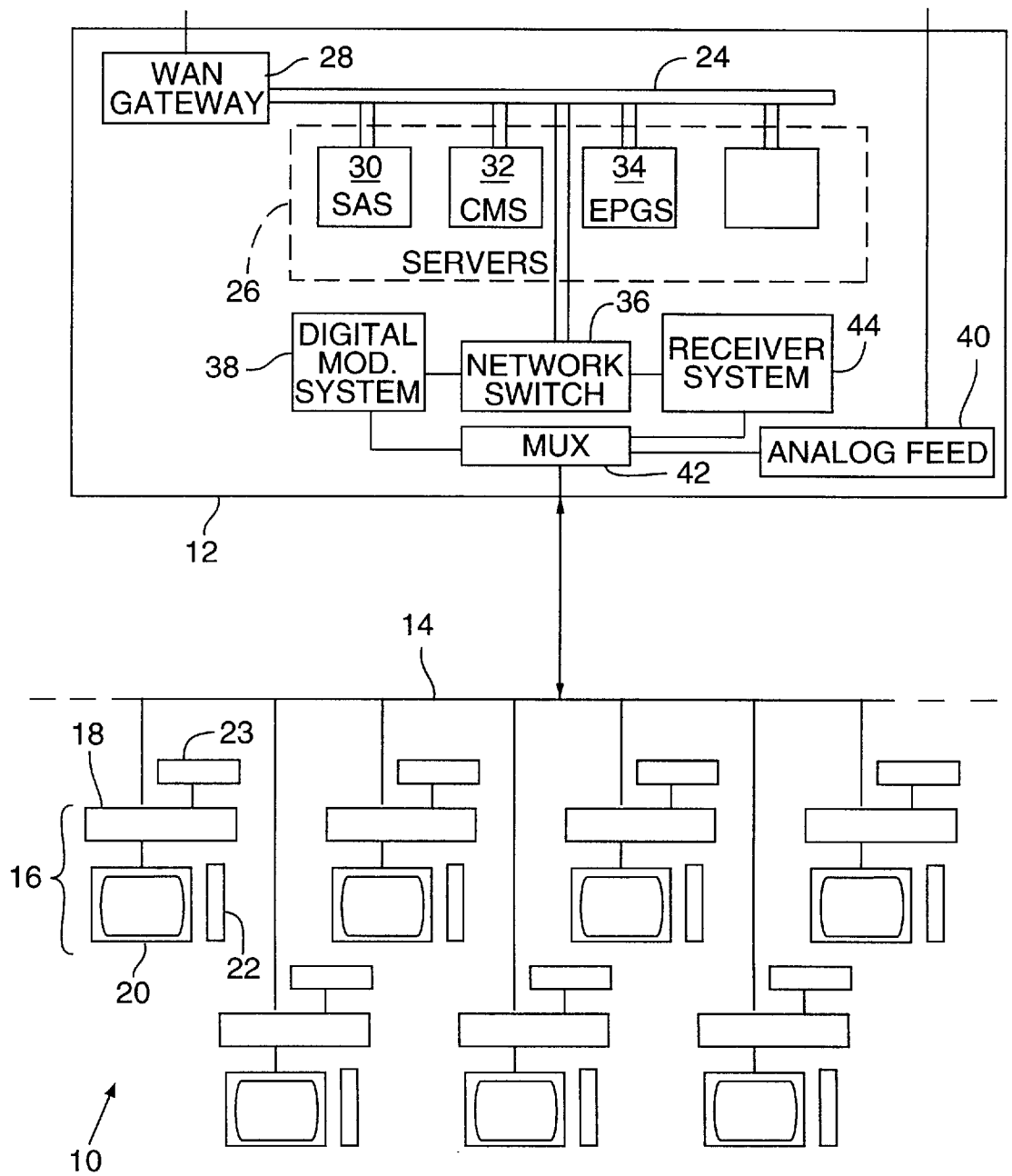
FIG. 1 is a block diagram of an interactive viewing system incorporating a preferred embodiment of the present invention.

A simple block diagram of an exemplary interactive viewing system 10 is illustrated in FIG. 1. The illustrated interactive viewing system is an interactive television system. The system 10 has a central head end 12 that supplies programming over a network 14 to multiple viewer stations 16 that are typically located in the homes of system users or subscribers. Each viewer station typically includes an interactive station controller 18, a video display 20, and a user input device 22. In the illustrated embodiment, the viewer station may also include a recording device 23, such as a video cassette recorder, operatively coupled to the interactive station controller 18. The viewer stations 16 accept user input and can, in addition to receiving programming from the head end 12, transmit information back to the head end. In this manner, the interactive viewing system 10, allows for independent two-way communication between the head end 12 and each of the viewer stations 16.

For purposes of simplicity, the interactive viewing system 10 is described with reference to widely available systems and standards, including conventional analog television receivers and cable-based video networks. It should also be appreciated, however, that the particular components of the interactive viewing system 10 may be implemented in accordance with a variety of conventions, standards, or technologies and still provide a suitable environment for implementation of the underlying concepts of the present invention. For example, the conventional analog television receivers and cable-based video network illustrated in FIG. I could be implemented as digital video receivers and a satellite downlink transmission system, respectively. Likewise, the cable-based network could be an electrically conductive cable network, an optically conductive cable network, some other network technology, or a combination of these technologies. It should also be realized that the programming provided by the head end 12 is not limited to traditional television programs. Rather, the programming may include standard analog video signals (e.g., NTSC, PAL or SECAM), digital video signals (e.g., MPEG1 or MPEG2), digital information related to computer-executed applications, or other types of programming.

As shown in FIG. 1, the head end 12 of the illustrated interactive viewing system includes a digital local area network (LAN) 24 that includes multiple computer servers 26 for performing various interactive system applications or functions and a digital communication gateway 28 to a wide area network (WAN) (not shown). The servers 26, which store and process information at the head end, may include, for example, service and application servers 30, continuous media servers 32, and electronic program guide data servers 34.

The service and application servers 30 process interactive service requests from subscribers and provide services and applications associated with network security, monitoring, object storage, financial transactions, data access, and other administrative functions. The service and application servers 30 may also contain a subscriber database. The subscriber database may store subscriber specific information such as each user's identity, a login code which identifies different users, a user's viewing preferences and history, and various user input for use by the system at future times. This database may be used to store, as described below, reminder tags and record tags set by various users of the system.

The continuous media servers 32 provide storage and ondemand or near on-demand delivery of digitized video information. The digitized video information can include video programming of substantially any duration ranging from individual image frames and brief video clips to full-length motion pictures. The continuous media servers 32 could be used to store programs recorded at the head end 12 in response to a record tag. The recorded program could then be provided to the user that set the record tag, at the user's request, over the network 14. If more than one user set a record tag for the same program, all could access a single stored recording from the continuous media servers 32.

The electronic program guide data server 34 stores program schedule information. For example, the program schedule information may include a program schedule database that identifies what program is available on a given channel at a given time. The program schedule information may also contain additional information about any particular program, such as, a brief description of the program, the stars of the program, a link to a video preview (stored on the continuous media server 32) for the program, whether the program is closed captioned, whether the program is stereo or a variety of other information. Such information is commercially available, for example, from Tribune Media Services or TV Data, both of Glens Falls, N.Y. Preferably, such information is delivered to the head end 12 via digital communication gateway 28 and an associated wide area network.

As used here, the servers 26 may include various types of memories for storing information and various types of processors for processing information. Various functions of the servers described here may be combined so as to be carried out by a single server or may be divided and allocated among more than one server. Moreover, there may likely be a variety of functions and services carried out by the servers 26 which are not described here.

The servers 26 communicate with the viewer stations 16 via a network communication switch 36, such as an asynchronous transfer mode (ATM) switch. For communication from the servers 26 to the viewer stations 16, the network communication switch 36 arranges digital information from the servers 26 in a standard bidirectional digital communication format for transmission over the network 14. For communication from the viewer stations 16 to the servers 26, the network communication switch 36 converts digital information from a standard bidirectional digital communication format for delivery to the servers 26.

In the exemplary system illustrated in FIG. 1, digital information from the servers 26 is frequency modulated by a digital modulator system 38 for transmission over the network 14. Digital information that includes video programming is preferably modulated at frequencies greater than the standard analog television frequency range, which is 50–450 MHz under the NTSC television standard. Digital information that does not include video programming may be modulated at baseband frequencies that are less than the standard analog television frequencies, modulated at frequencies between the standard analog television frequencies, or modulated at frequencies above the standard analog television frequencies.

The head end 12 may be provided with analog signals through an analog feed 40. The analog signals provided to the head end may be standard analog video signals for conventional cablecast of television programs or other analog information. A multiplexing system 42 receives and mixes the frequency modulated digital information from the digital modulator system 38 and analog signals obtained from the analog feed 40 and delivers a composite signal to the interactive network 14 where it is made available to viewer stations 16. A reverse channel receiver system 44 receives and demodulates communications from the viewer stations 16 for processing by the servers 26.

Preferably, the network 14 carries such bidirectional communication between the viewer stations 16 and the head end 12. Alternatively, communication between the viewer stations 16 and the head end 12 can be carried by different communication systems. For example, communication from the head end 12 to the viewer stations 16 could be carried on a satellite downlink while communication in the other direction is carried on a terrestrial modem link.

Figure 2:
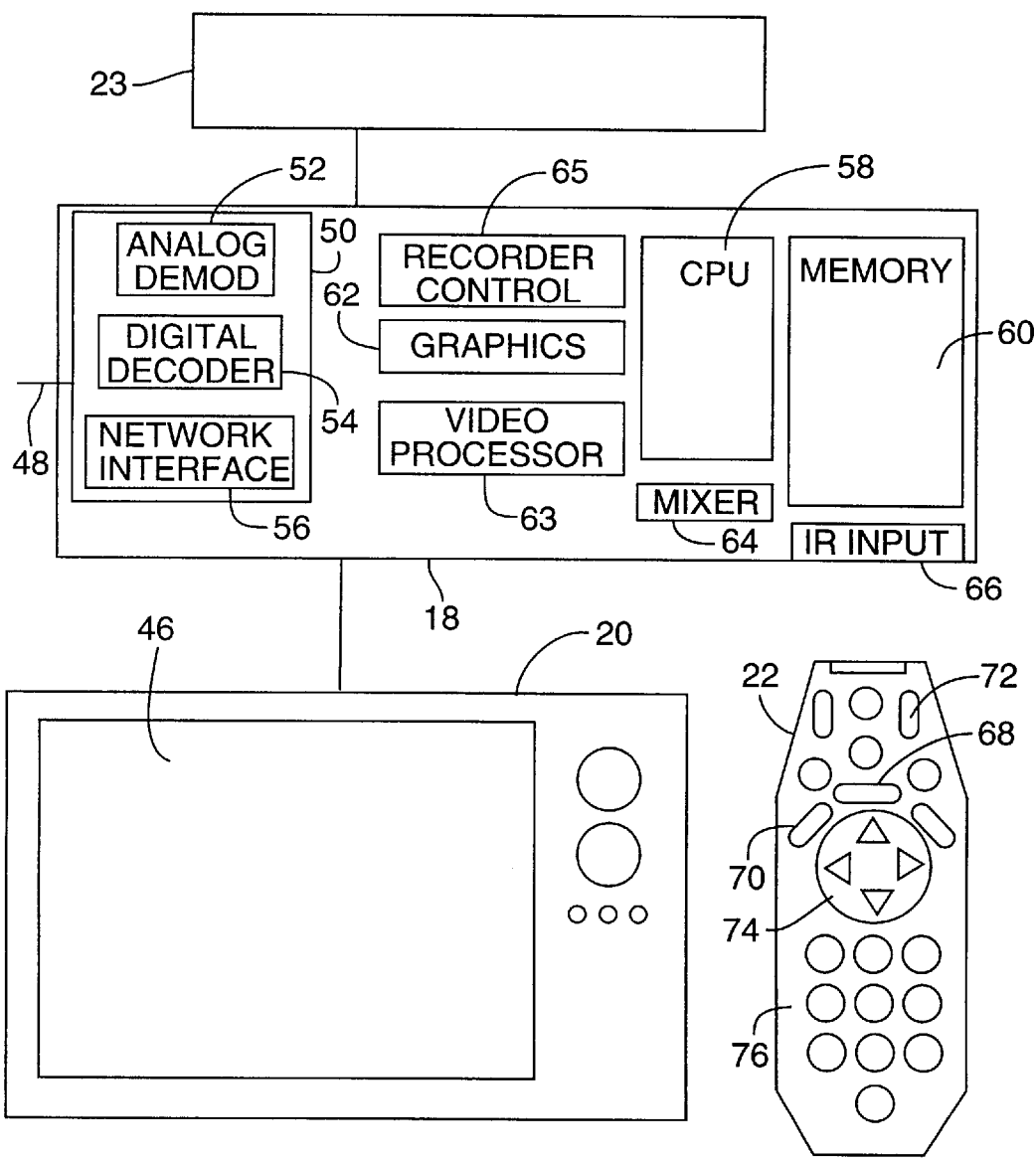
FIG. 2 is a block diagram of a viewer station as illustrated in FIG. 1.

A simplified block diagram of an exemplary viewer station 16 is illustrated in FIG. 2. The illustrated viewer station includes an interactive station controller 18 which is sometimes referred to as a set top box, at least one video display 20 such as a television, and an input device 22 such as an infrared remote control. In the illustrated embodiment, the viewer station may also contain a recording device 23, such as a video cassette recorder. Although shown as distinct components, two or more of the interactive station controller 18, the video display 20, and the recording device 23 could, alternatively, be combined into a single integral component.

The interactive station controller 18 controls the video display 20 and communicates with the head end 12. Controlling the video display 20 of a conventional analog type may include, for example, delivering an analog video signal directly to the video display 20 for display on a screen 46, converting a digital video signal to a suitable analog form for display, generating a video signal for display, or executing an application that includes displays on video display 20.

The interactive station controller 18 includes an input 48 from network 14 that delivers communications or information from the central head end 12 to a communication interpretation system 50 having, for example, an analog television demodulator 52, a digital video decoder 54, and a digital network communication interface 56. The demodulator 52 functions as a conventional television tuner for selecting one or more of multiple conventional analog video signals present at input 48. The video decoder 54 functions as a digital equivalent of demodulator 50 for selecting one or more of multiple digital video signals present at input 48.

The network communication interface 56 communicates with digital information carried over baseband frequencies below the conventional analog video signal frequencies, over frequencies between conventional analog video signal frequencies, and over frequencies above conventional analog video signal frequencies.

A central processing unit (CPU) 58 in conjunction with a memory system 60 controls operation of the interactive station controller 18. For example, the CPU 58 controls selection of analog-based programming, digital-based programming or applications delivered from the head end 12, accesses or activates selected applications, or delivers information to or requests information from the head end 12.

The interactive station controller 18 also may include a graphics subsystem 62 that is controlled by the CPU 58 to form graphics images, including user interface displays, on the video display 20. A video processor subsystem 63, also controlled by the CPU 58, provides control in generating and displaying video images. A mixer 64 receives the programming or applications signals received from the central head end 12 or CPU 58, graphics image signals from graphics subsystem 62, and video image signals from the video processor subsystem 63 and delivers a mixed image signal to video display set 20. As used here, mixing may include compositing, blending, and masking of image sources such as digital video, analog video, locally generated graphics and various overlays and bitmap images.

In the exemplary system illustrated in FIG. 2, the interactive station controller also contains a recorder control subsystem 65. The recorder control subsystem is operatively coupled with the recording device 23 such that the interactive station controller 18 can control the recording device 23. For example, the interactive station controller could be hardwired to the recording device and provide control signals directly to the recording device. An example of this type of control is the Control-L consumer electronics serial device standard from Sony Corporation. Alternatively, the recorder control subsystem 65 might include an infrared emitter (not shown) that can be controlled to emit infrared control signals that emulate signals emitted by a remote control for the recording device 23. Other methods of controlling the recording device might also be used.

In any case, the head end may contain a database, preferably stored on the service and applications server 30, that contains a listing of commercially available recording devices and a catalogue of appropriate control signals for those devices. During installation of the recording device, the user can identify, preferably in response to a system prompt, the particular recording device installed. The CPU 58 could then access the database at the head end with the identity of the recording device and obtain appropriate control signals for the device. These signals might be used by the interactive station controller to program the recording device for future recording or could be provided on a real-time basis to control recording.

The CPU 58 also includes an infrared receiver and decoder system 66 that receives user input from the user input device 22 and delivers the input to the CPU 58. The input device 22 can be used by a user of the interactive viewer system 10 to input commands. The input device 22 is provided with a number of keys which may be pressed by a user to input commands. Based upon the keys pressed by a user, the input device 22 generates and emits infrared signals. These signals are detected by the infrared receiver and decoder system 66 of the interactive station controller 18, decoded, and provided to the CPU 58. The commands may be processed by the interactive station controller 18, may be communicated to the head end 12 for processing, or a combination of both. In the example system illustrated in FIG. 2, the input device 22 is a hand-held infrared remote control.

The illustrated input device includes at least a menu key 68, an action key 70, a channel up/down key 72, a navigation key 74, and a numeric keypad 76. The uses and functions of these keys are described further below.

The interactive viewing system 10 may include a variety of interactive program guides which allow a user to identify and select programs. For example, the system 10 may include a category-based program guide and personalized program guides based on a user's personal preferences and viewing habits. The recording system of the current invention could be implemented with any or all of these guides in much the same manner However, for clarity, it is described here in the context of a program time guide.

Figure 3:
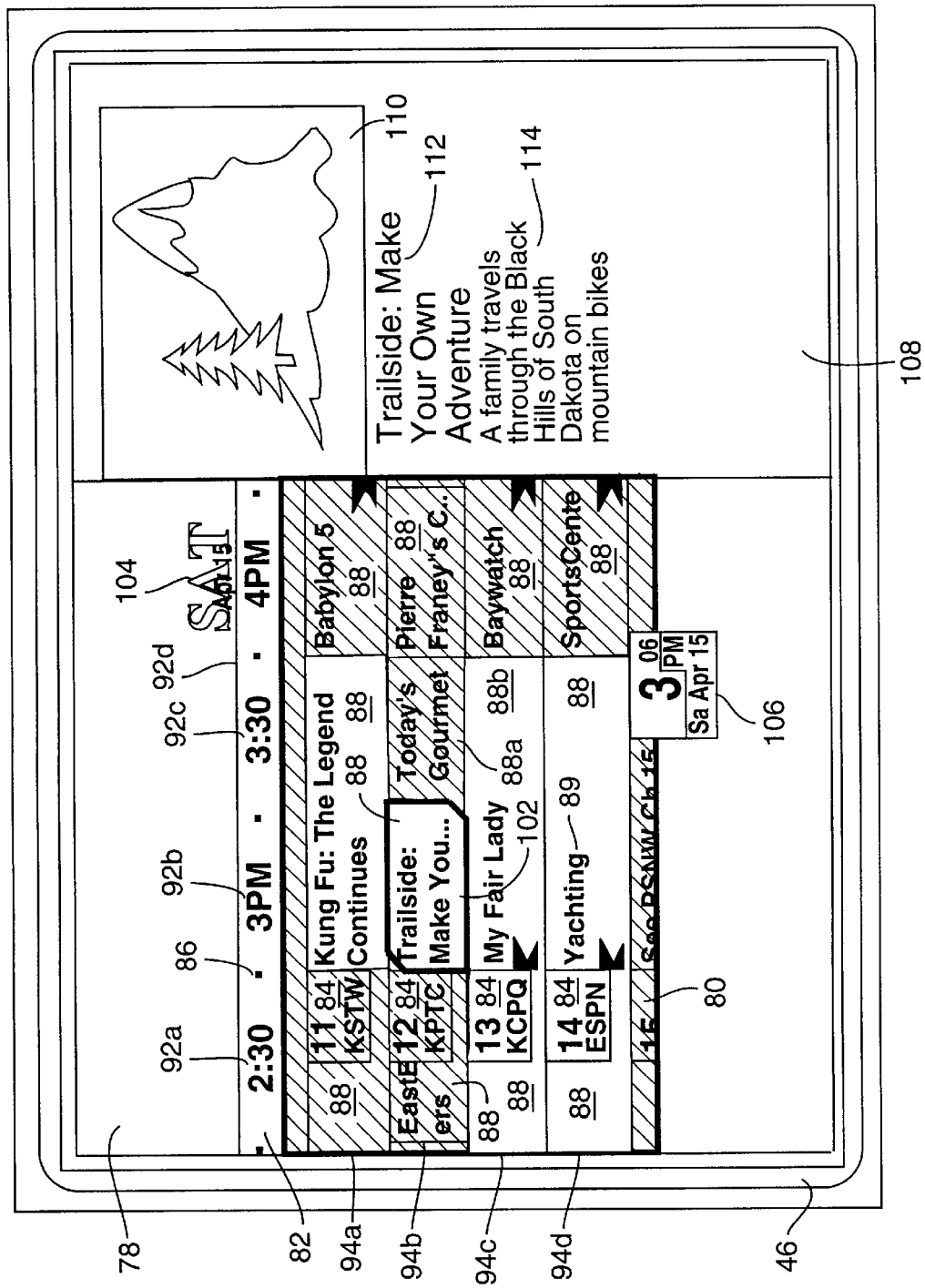
FIG. 3 illustrates the screen of the video display on which a sample of a preferred display of the program time guide is shown.

The screen 46 of the video display 20 showing an exemplary display screen 78 of a program time guide is shown in FIG. 3. The interactive station controller 18 controls the generation and display of the program time guide on the video display 20. In generating the program time guide, the interactive station controller 18 can receive input from the input device 22, can obtain information from the head end 12, and can utilize information stored in the memory system 60 at the interactive station controller.

The exemplary display screen 78 includes a program grid 80 which provides a user with program schedule information as to the times and channels on which various programs are available. Associated with the program grid are a time panel 82 and a number of channel panels 84. The time panel 82 extends horizontally across the upper portion of the program grid 80 and is, in the illustrated display, divided into half-hour time increments. The time increments are labeled and are separated by dividers 86 so as clearly delineate a grid column 92a–92d for each time increment. The channel panels 84 are arranged along a vertical axis to identify rows 94a–94d within the program grid 80. In the illustrated program grid, time is on the horizontal axis and channels are on the vertical axis. However, these could be switched in other embodiments.

The program grid 80 contains a number of program tiles 88. Each program tile 88 corresponds to a program and is provided with a label 89 to identify that program. Each program tile 88 is positioned within the program grid 80 at the intersection of the times during which the program is available and the channel upon which the program appears. The label 89 of the program tile 88 may be the program title, an abbreviation of the program title or any other indicator which identifies the corresponding program. The label 89 is typically displayed beginning at the left hand side of the program tile 88. However, if the left-most part of the program tile 88 extends off the program grid 80 or is obscured, the label is displayed beginning in the left-most column that is fully visible. In this way, a user can readily see the label at all times.

The program tiles 88 have a uniform height. The length of each of the program tiles 88 may vary, however, and is determined by the length of the program it represents. For example, in the illustrated program grid, a half-hour program would be represented by a program tile 88a that spans one column and an hour program would be represented by a program tile 88b which spans two columns. For programs whose duration is not a multiple of thirty minutes, the program tiles can be sized to span fractions of a column.

Similarly, if a program does not begin on the hour or on the half-hour, it may positioned so as to span only that portion of the column that corresponds to the time during which it is actually available.

The program grid 80 also includes a focus frame 102 which identifies a selected program tile within the program grid. In the illustrated embodiment, the focus frame 102 identifies a selected program tile by drawing a conspicuous border around the tile. However, other methods of identifying the selected tile might also be used. For example, the focus frame 102 might identify the selected tile by shading it a different color. As explained below, the focus frame 102 can be used to obtain more information about a particular program, to navigate through the program time guide, or to perform various actions such as identifying a program for which a reminder is to be set or for which a record tag is to be set.

In addition to the program grid 80, the exemplary display screen 78 includes various other components which facilitate use of the program time guide and provide additional information to the user. For example, the illustrated display includes a display date panel 104, a current date and time panel 106, and a program summary panel 108. The display date panel 104 identifies the day of the week and the date for which program schedule information is currently being displayed. The display date panel 104 is particularly useful to help a user remain oriented when viewing program schedule information for a date other than the current date. In the exemplary display screen 78, the current date and time panel 106 is superimposed over a lower portion of the display. A program summary panel 108, which preferably provides additional information about the program identified by the focus frame 102, is displayed on the right side of the video display screen 46.

The illustrated program summary panel 108 may include a preview window 110, the full title of the program 112, a description of the program 114, and may also contain one or more informational icons (not shown) which indicate characteristics of the program such as whether the program is closed captioned, whether the program is a rerun and whether the program is in stereo. In addition, user specific icons may be provided to indicate certain characteristics set by the user. For example, an icon can be provided to indicate whether the user has set a reminder for the indicated program or whether the user has set a record tag for the indicated program. These icons are user specific and are displayed in the program guides for those users that set the associated tags. In this manner, a user of the program guide can quickly and easily determine which programs have been set for a reminder and which programs have been set for recording. In alternative embodiments, it may be desirable to display icons within the program tiles 88 rather than within the program summary panel 108.

The focus frame 102, in conjunction with a navigation key 74 on the input device, allows a user to navigate through the program grid 80. The navigation key 74, shown in FIG. 2, is preferably a rocker type switch which can be operated in at least four distinct positions represented, in the illustrated embodiment, by arrows drawn on the input device. A single press on the navigation key 74 in the up direction will cause the focus frame 102 to move up one row in the program grid 80 and a single press on the navigation key 74 in the down direction will move the focus frame 102 down one row. Likewise, a single press on the navigation key 74 in the left or right direction will move the focus frame 102 to the next program tile 88 in the left or right direction, respectively. In alternative embodiments, the navigation key 74 may have more than four positions to allow diagonal movement of the focus frame. Holding the navigation key 74 in a pressed position causes the focus frame 102 to move in the corresponding direction so long as the navigation key 74 remains pressed. The navigation key 74 might also be structured to sense pressure, so that the speed with which the focus frame 102 moves increases as the pressure used to press the navigation key increases.

In the exemplary display of FIG. 3, the focus frame 102 can be moved freely within the fully visible columns 92b–92d and rows 94a–94d of the program grid, i.e. the "roam area". In the illustrated embodiment, the first column 92a, which is partially obscured by the channel panels 84, is not considered fully visible. Any attempt to move the focus frame 102 beyond the roam area will cause the program grid to scroll so as to maintain the focus frame within the fully visible portion of the program grid. In particular, when the focus frame 102 is moved to a row or column of the program grid 80 that is outside the roam area, the interactive station controller 18 obtains program schedule information for that row or column and scrolls the program grid 80 to move that row or column into the roam area. At the same time, the row or column on the opposite side of the roam area is scrolled out of the roam area.

The interactive station controller 18 also scrolls the time panel 82 when a new column is revealed and the channel panels 84 when a new row is revealed so that the time panel 82 and channel panels 84 correspond to the information displayed in the program grid 80. Likewise, when a user moves the focus frame 102 to a date that is no longer the current date, the interactive station controller 18 changes the display date panel 104 to correspond with the displayed information.

A flow diagram illustrating the basic operation of the illustrated program time guide with the recording system implemented therein is shown in FIG. 4. As indicated in block 200, use of the program time guide is initiated at the user's command. Preferably, the program time guide is assigned a channel number so that the user can begin a session with the program time guide by entering that channel using the numeric key pad 76 on the input device 22 or navigating to that channel using the channel up/down key 72 on the input device 22.

After the user initiates the program time guide, the CPU 58 initializes various parameters, block 202. For example, the CPU sets the display date and time to the current date and time, the display channel is set to the last channel viewed before the program time guide was initiated, and the focus frame 102 is set to identify the program tile 88 for the program currently airing on the display channel.

Once the initial program time guide parameters have been set, the program time schedule information (referred to as "PSI" in FIG. 4) needed to complete the program grid is obtained from the head end 12 as indicated in block 208. In the preferred embodiment, program schedule information at the head end 12 is stored in a database on the electronic program guide data server 34. Preferably, the program schedule information at the head end covers a time period extending about one week into the past and two weeks into the future. Of course, this time period may vary depending on the needs and capacity of a particular system.

Initially, the CPU 58 obtains sufficient program schedule information from the head end 12 to fill a specified amount of the memory system 60 at the interactive station controller 18. This amount is preferably more than is needed to generate the initial display of the program grid 80 so as to allow for limited scrolling of the program grid without retrieving additional program schedule information from the head end.

Once the program schedule information is available at the interactive station controller 18, the CPU 58 can use that information to control the generation and display of the program time guide on the screen 46 of the video display 20, as represented in block 210.

As illustrated in block 212, the current time and date are set and program tiles for currently available programs are highlighted on the display to indicate their current availability to the user. The current time and date and current availability are preferably updated on a continuous basis, possibly by an independent portion of the system.

When the program time guide is displayed, the displayed information is not changed except upon a user command. Thus, the CPU 58 monitors to determine whether any commands are received from the input device 22. If the channel up/down key 72 is pressed, detected in block 214, the CPU turns to the appropriate channel, block 215, and suspends the program time guide, block 216. As indicated in block 218, if the CPU detects the entry of a channel number the CPU turns to that channel, block 219, and suspends the program time guide, block 220. Turning to a designated channel may involve tuning a tuner to receive a signal assigned to that channel, launching a computer executed application assigned to that channel, or performing some other action assigned to that channel.

Figure 5:
FIG. 5 illustrates a partial screen of the video display on which an exemplary current program options menu panel illustrating available options for a selected currently available program is shown.

As represented by block 222 the CPU monitors to see if the action key is pressed. If the action key is pressed, the system checks to see if the focus frame indicates a currently available program, as indicated in block 224. If so, a current program options menu 126, illustrated in FIG. 5, is displayed as represented by block 226 of FIG. 4. As illustrated in blocks 228–234 of FIG. 4, the system monitors the user's menu selection and acts accordingly. As an alternative, step saving procedure, pressing the action key with a current program selected could cause the system to turn directly to the selected program. A separate key could be provided to allow the user to display the options menu.

In the exemplary display of FIG. 5, the illustrated current program option menu 126 contains a Go To Show button 128, a Record button 130, and a Cancel button 132. A menu focus frame 134 identifies one of the three buttons. The user can move the menu focus frame 134 to select a desired button by using the navigation key 74 on the input device 22. Once the desired button is selected, the user can press the action key 70 on the input device 22 to perform the desired action. In the illustrated current program options menu 126, activation of the Go To Show button 128 causes the interactive station controller to tune to the selected channel and suspend the program time guide. Activation of the Record button, causes the interactive station controller to immediately activate the recording device 23 and control it to record the selected program. Alternatively, the interactive station controller could instruct a recording device at the head end to record and store the selected program. Activation of the Cancel button 132 returns to the program time guide.

The particular menu options and actions associated with the current program options menu, and the other menus described below, could vary. For example, if the selected program was a pay-per-view program, the current program options menu could include an option to order the program.

Referring back to FIG. 4 at block 236, if a future program is identified by the focus frame 102 at the time the action button is pressed, a user may want to set a reminder for the future program or to set a record tag for the future program. As indicated in block 238, the system displays a future program options menu to allow the user to select these, or possibly other, actions. The system then monitors the user's menu selections and implements the requested action, as indicated in block 240.

Figure 6:
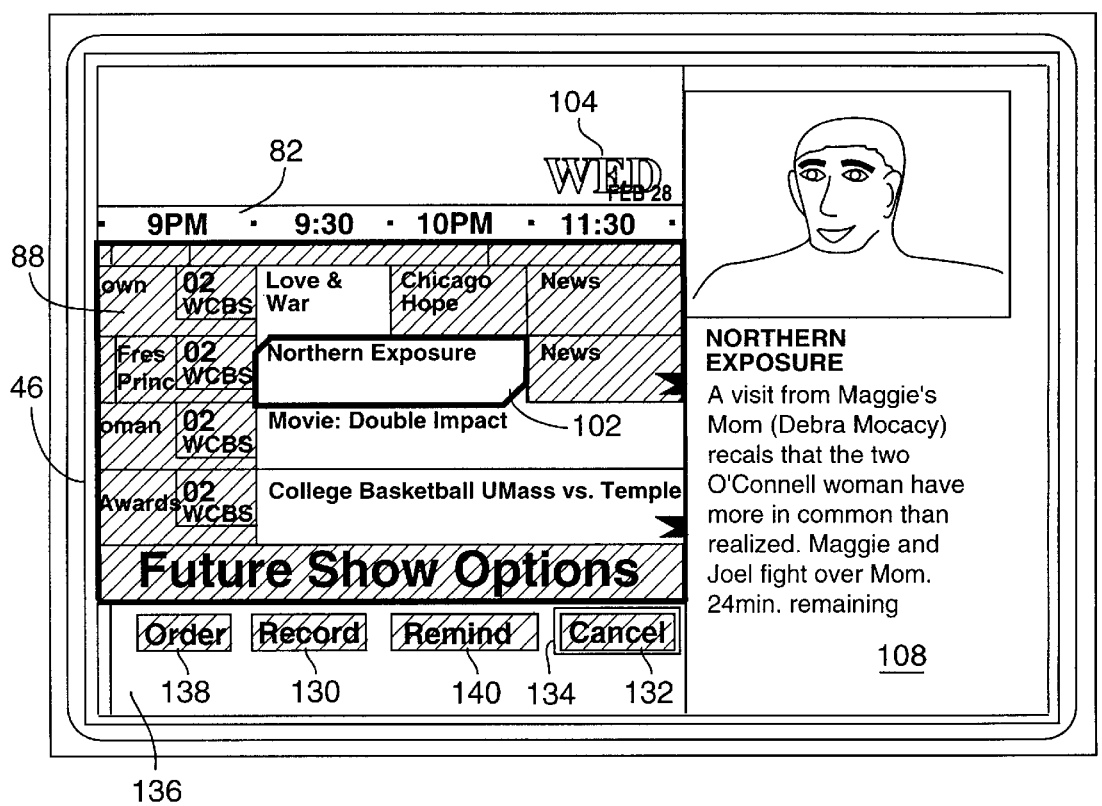
FIG. 6 illustrates a screen of the video display on which another sample of a preferred display of the program time guide is shown along with an exemplary future program options menu panel.

In the context of the illustrated program guide, the process of setting a reminder for a program or setting a record tag for a program is integrated into the future program options menu. Accordingly, a more detailed description of the process of monitoring and implementing the user's menu selections from the future program options (block 240 in FIG. 4) is illustrated in the flow diagram of FIG. 7. Before starting at block 300, the future program options menu 136 has already been displayed by the system. An example of the future program options menu 136 in the context of the program time guide is illustrated in FIG. 6. The future program options menu 136 is preferably displayed beneath the program grid 80. Upon display of the future program options menu 136, the program grid 80 and the focus frame 102 within the program grid are preferably dimmed to indicate that the future program options menu 136 is active.

Once the menu is displayed, the system monitors for user input. In the exemplary future program options menu of FIG. 6, the future program options menu 136 includes an Order button 138, a Remind button 140, a Record button 130, and a Cancel button 132. As explained above the user can navigate between the buttons by moving the menu focus frame 134 with the navigation key 74. Pressing the action key 70 activates the button identified by the menu focus frame 134

As indicated in block 302 the CPU monitors to determine if the Cancel button is activated. If so, the system returns to the program time guide, block 304.

In the illustrated example, the CPU monitors to determine if the Order button is activated, block 306. The Order button is only displayed as a menu option if the program identified by the focus frame 102 is a pay-per-view program or a similar program which requires ordering. If the Order button is activated, the system displays a menu, block 308, to facilitate ordering of the selected program. The system then monitors and implements the user's menu selection, block 310, and returns to the program time guide, block 312.

To set a reminder, the user selects the Remind button in the future program options menu. Selection of the Remind button is detected at block 314. If the Remind button is activated, the system checks to see if a reminder has already been set for the program, block 316. If it has not, the system allows a user to set a reminder for the program, blocks 318–334. If a reminder has already been set for the selected program, the system allows the user to remove or alter the reminder, blocks 336–344.

Figure 8:
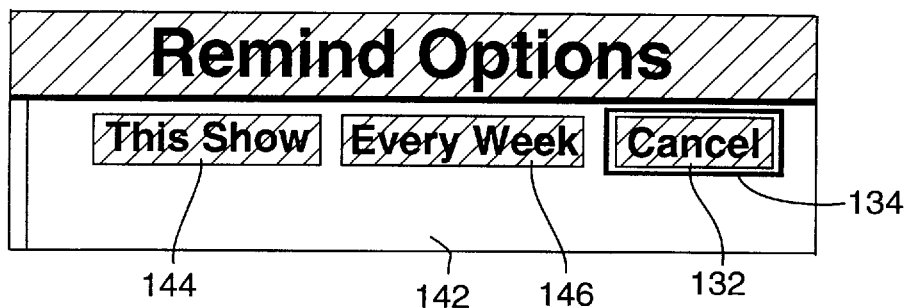
FIG. 8 illustrates a partial screen of the video display on which an exemplary remind options menu panel is shown.

To allow the user to set a reminder for the selected program, the system displays a remind options menu, block 318. The remind options menu preferably replaces the future program options menu on the display screen. An example of a preferred remind options menu is illustrated in FIG. 8 as reference numeral 142. The exemplary remind options menu 142 has a This Show Button 144, an Every Week button 146, and a Cancel button 132. Activation of the Cancel button 132, block 320, causes the system to return to the program time guide without setting a reminder, block 322. Activation of the This Show button 144, as determined in block 324, causes the system to set a reminder for the selected program, as indicated by block 326. The system then returns to the selected program guide, block 328. Activation of the Every Week button 146, as determined in block 330, causes the system to set a reminder for the selected program and for the program on that channel and time slot every week thereafter, as indicated by block 332. The system then returns to the program time guide, block 334. The Every Week button is displayed only if the program in the same time and channel slot for the next week has the same title as the selected program. The system also checks to see whether the program in the same time and channel slot for the next day has the same title. If so, the future options menu displays an Every Day button (not shown). Selection of the Every Day button sets a reminder for the selected program and for the daily time and channel slot of the selected program.

Once a reminder for a program has been set, a user may wish to alter or remove the reminder from a particular program. To do this, the user can activate the Remind button while that program is selected. When the system determines, block 316, that a reminder has already been set for the selected program, the system will display a menu, block 336, that allows a user to remove or alter the reminder. This menu (not shown) would typically contain an option to allow a user to return directly to the program time guide without performing any action, blocks 338–340. The menu would also contain an Unremind button (not shown) that would allow the user to remove an existing reminder. As represented by blocks 342–344, the system monitors and implements the user's menu selections and returns to the program time guide.

Figure 9:
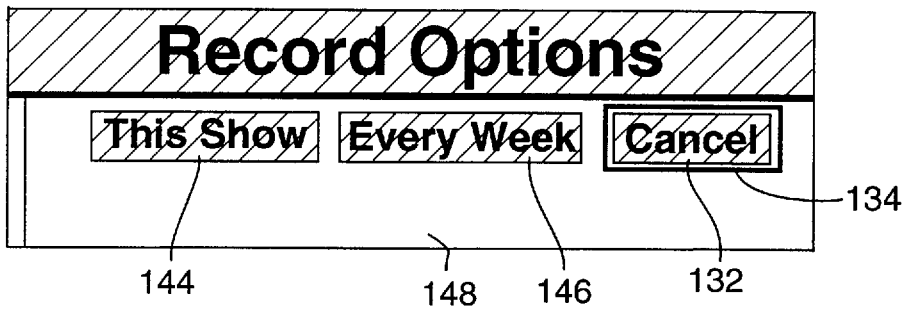
FIG. 9 illustrates a partial screen of the video display on which an exemplary record options menu panel is shown.

A user can set a record tag by activating the Record button 130 in the future program options menu 136. Accordingly, the system monitors to determine whether the Record button is activated, block 346. If so, the system determines whether the user has previously requested recording of the selected program, block 348. If not, the system displays a record options menu, block 350. The record options menu, an example of which is illustrated in FIG. 9 as reference number 148, contains a This Show button 144, an Every Week button 146, and a Cancel button 132. As explained above, the menu might also include an Every Day button. The Every Week button and the Every Day button are displayed only if a program with the same title appears in the appropriate time slot. If the Every Day button is displayed, the Every Week button will not be displayed.

Activation of the Cancel button 132, as determined at block 352, causes the system to return to the program time guide without performing any action, block 354. Activation of the This Show button, block 356, causes the system to set a record tag for the selected program, block 358. The system then returns to the program time guide, block 360. Activation of the Every Week button, determined at block 362, causes the system to set a record tag for the identified program and for the program available in the same time and channel slot every week thereafter, block 364. The system then returns to the program time guide, block 366. If displayed, activation of an Every Day button would set a record tag for the selected program and for the same daily time and channel slot and return to the program time guide.

A record tag can be though of as a request to the system to record a program. Each record tag is associated with a program to be recorded and the viewer station or user that set the record tag. In the illustrated embodiment there are two types of record tags, one associated with a particular program that is set in response to activation of the This Show button. This type of record tag is automatically removed once the time for the associated program has past. Another type of record tag is associated with a particular daily or weekly channel and time slot. This type of record tag set in response to activation of the Every Day button or Every Week button and automatically moves from one day or week to the next after recording the associated program. This type of reminder will remain set until removed by a user and is useful for allowing a user to record, for example, successive episodes of a daily or weekly series by setting only a single record tag.

Preferably, when a record tag is set, it is stored at the head end 12. For example, the record tag may be stored in a database on the service and application servers 30, or on some other server 26. In this manner, the head end can monitor all of the record tags set by the various system users.

Once a record tag for a particular program is set, the system monitors the record tag and, at the appropriate time, controls the recording of the associated program. In the illustrated embodiment, head end 12 informs the interactive station controller 18 when a program having an associated record tag is available. Alternatively, the interactive station controller 18, could periodically poll the head end to determine whether a record tag has been set for a program. The interactive station controller 18 then controls the recording device 23 to record the associated program. As indicated above, the interactive station controller 18 could either pre-program the recording device 23 or could control the recording device 23 using real-time commands.

In an alternative embodiment, a recording device is associated with the head end 12. The head end monitors the record tags of all system users and if any user has set a record tag, the head end controls the recording device to record the program. The recorded program is stored at the head end 12, preferably on the continuous media servers 32. Users could then access the head end, on demand, to retrieve and view the recorded program. This alternative would allow multiple users to access a single recording of the program. Stored recordings could also be archived to allow access by users who, although they did not set a record tag, later wish to view the program.

As can be appreciated, the current recording system allows a user to quickly and easily set a record tag for a program selected from a program guide. The system then automatically stores and monitors the record tag and controls recording of the selected program. Preferably, at the time a record tag is set the system also associates a record icon with the selected program. The record icon can then be displayed when the user accesses the system's program guides. In this way, users can readily determine which programs have record tags set and which do not.

Figure 7:
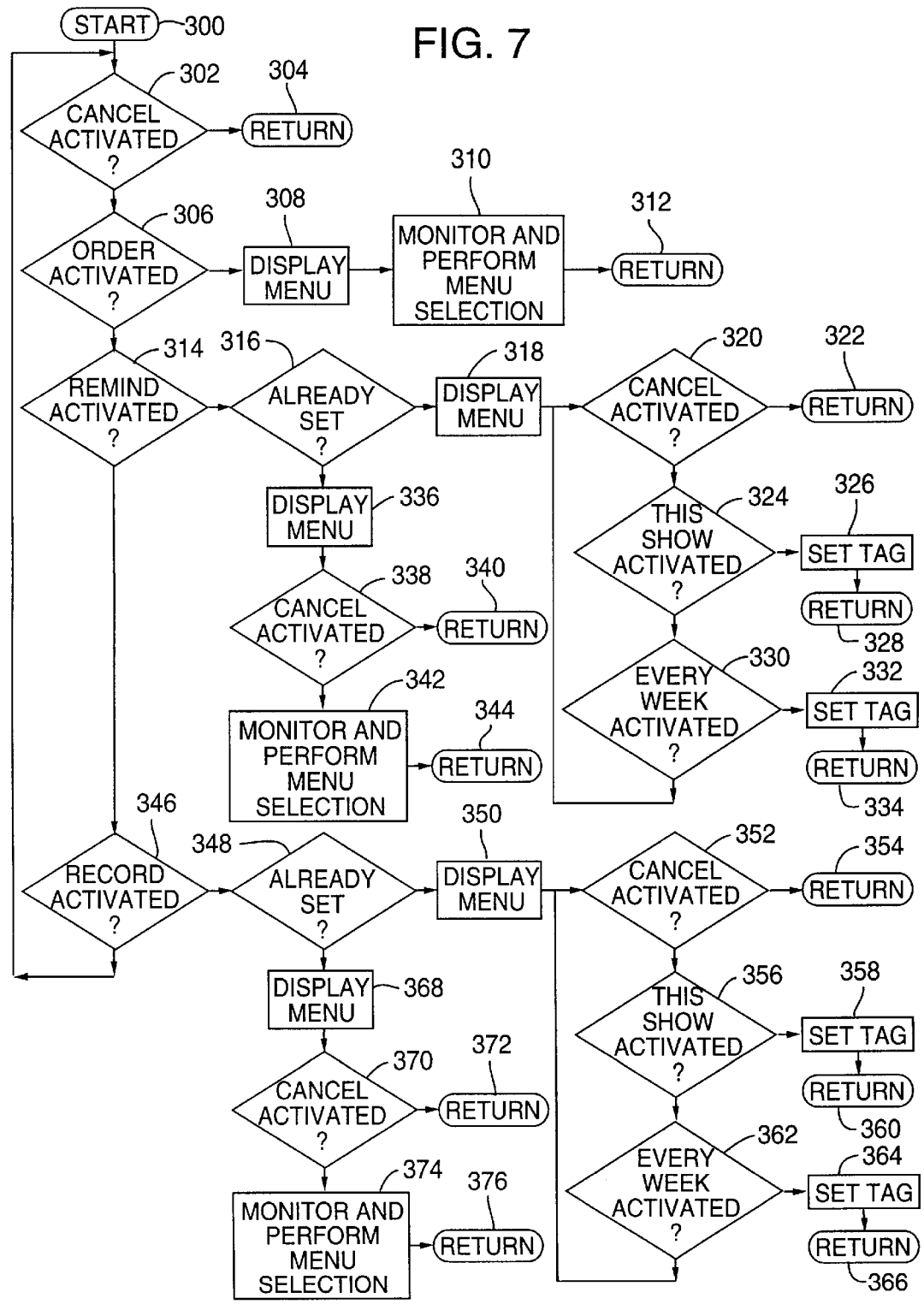
FIG. 7 is a flow diagram illustrating part of the operation of a preferred embodiment of a program time guide in which a recording system in accordance with a preferred embodiment of the present invention has been implemented.

As indicated in blocks 368–376 of FIG. 7, activation of the Record button when the selected program already has a record tag set will display a menu allowing the user to remove the record tag.

Figure 10:
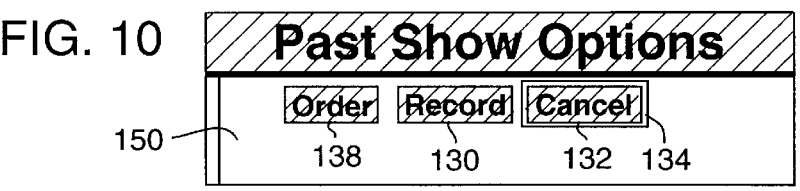
FIG. 10 illustrates a partial screen of the video display on which an exemplary past program options menu panel is shown.

Returning to the operation of the exemplary program time guide illustrated in FIG. 4, if the selected program is not a current or future program, the program time guide continues at blocks 242 and 244. If the focus frame 102 indicates a past program when the action key is pressed, a past program options menu 150, an example of which is illustrated in FIG. 10, is displayed. The CPU 58 then monitors the user's menu selection and acts accordingly, as indicated in block 246. In the case of a past program, the menu may allow a user to determine whether the program was recorded by the user or whether a recording of the program is available for ordering from the head end. Again, the menu may also include other options.

As illustrated in block 248, the CPU monitors to determine if the menu key is pressed by a user. If so, the CPU controls the display of a menu of available options, as represented in block 249. The options may allow a user to select an alternative program guide such as a category-based program guide or a personalized program guide based upon user preferences and viewing habits. If one of these guides were selected from the menu and used to select, for example, a future program, preferably the future program options menu would be displayed and monitored to allow a user to set a reminder for the identified program or to set a record tag for the identified program in the same manner described in connection with the program time guide. In any case, the CPU monitors the user's menu selection, carries out the related functions and either returns or suspend the program guide depending on the menu selection, as represented by blocks 250–257.

As illustrated in block 258, the CPU also monitors to see if the navigation key 74 is pressed. If it is not, the CPU returns to block 212, updates the current time and date and, if necessary, the highlighting indicating current program availability, and continues to monitor for user commands. If the navigation key 74 is pressed, the CPU updates the position of the focus frame, block 259; retrieves, as needed, program schedule information from the head end to update the program summary panel, block 260; and, if necessary, updates the display date panel, block 262. If the focus frame 102 has been moved beyond the roam area, block 264, the CPU obtains additional program schedule information, 266–272, scrolls the program grid, block 274, and returns to block 210 to display the scrolled grid.

Although the operation of the exemplary system has been described as involving many discrete steps performed in a particular order, it should be appreciated that the system preferably is implemented in a smooth, visually appealing manner so that the individual steps are not observed by the user. To accomplish the this, many of the steps described here may performed concurrently or may be performed in a different order than described.

This detailed description is set forth only for purposes of illustrating examples of the present invention and should not be considered to limit the scope thereof in any way. Clearly, numerous additions, substitutions, and other modifications can be made to the invention without departing from the scope of the invention which is defined in the appended claims and equivalents thereof.

What is claimed is:

1. In an interactive viewing system having a head end in two-way communication with a plurality of viewer stations having a video display operatively coupled to a controller, the head end providing to the viewer stations programming comprising a plurality of programs provided on a plurality of channels, the system including at least one interactive program guide for listing one or more of the plurality of programs, a method of recording a selected program available at a future time, the method comprising the steps of:

displaying the program guide on the video display;

selecting the selected program from the program guide;

setting a record tag associated with the selected program, said record tag indicating that the selected program is to be recorded;

storing the record tag at the head end;

monitoring the record tag to determine the future time; and recording the selected program at the future time.

2. The method of claim 1 further comprising the step of providing an icon indicating that a record tag has been set and displaying that icon in the program guide.

3. The method of claim 1 in which the viewer stations further include a recording device operably coupled to the controller and wherein the recording is accomplished by the recording device under the control of the controller.

4. The method of claim 1 in which the recording is performed at the head end and further comprising the steps of:

storing the recording of the selected program at the head end; and providing the recording of the selected program to the viewer station at the request of the controller.

5. The method of claim 4 in which the head end stores program schedule information which identifies for the plurality of programs a time at which the program is available and a channel on which the program is available and further comprising the steps of:

determining whether a second program available on the same channel as the selected program a predetermined time after the future time has the same title as the selected program; and causing the record tag to be reset for the second program if the determination is positive.

6. The method of claim 5 in which the predetermined time is one day.

7. The method of claim 5 in which the predetermined time is one week.

8. The method of claim 5 further comprising the step of causing the record tag to be automatically reset for each successive predetermined time.

9. In an interactive viewing system having a head end in two-way communication with a plurality of viewer stations having a video display operably coupled to a controller, the head end providing to the viewer stations programming comprising a plurality of programs provided on a plurality of channels, the head end storing program schedule information which identifies for the plurality of programs a time at which the program is available and a channel on which the program is available, the system including at least one interactive program guide for listing one or more of the plurality of programs on the video display, a system for recording a selected program available at a future time, the system comprising:

an input device for inputting user commands to the controller, the user commands including commands to cause the display of the program guide on the video display of the user's viewer station, the user commands further including commands to allow the user to navigate through the program guide to display program information for the plurality of programs to locate and identify the selected program, wherein identification of the selected program in the program guide causes the controller to set a record tag indicating that the selected program is to be recorded at the future time;

a communication system associated with the controller for communicating the record tag to the head end for monitoring to determine the future time; and a recorder for recording the selected program, the recorder being associated with the head end and controlled by the head end to record the selected program and store the recording of the selected program at the head end.

10. The system of claim 9 wherein the user commands further include a command to cause the controller to obtain the recording from the head end.

* * * * *